United States Patent [19]

Takamune et al.

[11] E Re. 29,637

[45] Reissued May 23, 1978

[54] BATTERY-DRIVEN WATCH WITH BATTERY CONSUMPTION DISPLAY ALARM

[75] Inventors: Hirotoki Takamune, Hoya; Fujio Ishida, Kokubunji, both of Japan

[73] Assignee: Citizen Watch Co., Ltd., Tokyo, Japan

[21] Appl. No.: 821,207

[22] Filed: Aug. 2, 1977

Related U.S. Patent Documents

Reissue of:

[64] Patent No.: 3,898,790
Issued: Aug. 12, 1975
Appl. No.: 413,951
Filed: Nov. 8, 1973

[30] Foreign Application Priority Data

Nov. 9, 1972 Japan ..... 47-112465
Nov. 20, 1972 Japan ..... 47-116312

[51] Int. Cl.[2] ..... G04C 3/00; G04B 19/30; G08B 21/00

[52] U.S. Cl. ..... 58/23 BA; 58/50 R; 58/152 H; 235/92 T; 340/249

[58] Field of Search ..... 58/23 BA, 50 R, 152 H; 235/92 T; 340/248 A, 248 B, 249; 323/33 VR, 15, 19; 361/91

[56] References Cited

U.S. PATENT DOCUMENTS

| | | | |
|---|---|---|---|
| 3,562,625 | 2/1971 | van der Broek et al. | 340/248 A X |
| 3,672,155 | 6/1972 | Bergey et al. | 58/50 R |
| 3,679,965 | 7/1972 | Wilkinson | 323/19 |
| 3,691,452 | 9/1972 | Aguiar | 323/19 |

*Primary Examiner*—Edith S. Jackmon
*Attorney, Agent, or Firm*—Holman & Stern

[57] ABSTRACT

The invention provides an advance alarm means incorporated with an electronic watch driven by a battery and fitted with a digital time display means.

There is provided a detector sensing an abrupt voltage drop at the source battery. A selector represents its two states corresponding to the normal operating condition of the battery and to the voltage dropped condition thereof, respectively. This selector controls the feed of two different signal series to at least one electrically illuminatable elements of the digital time display means, depending upon the state of the selector and for providing an advance alarm before occurrence of an unacceptable voltage drop in the source battery.

10 Claims, 9 Drawing Figures

FIG. 1
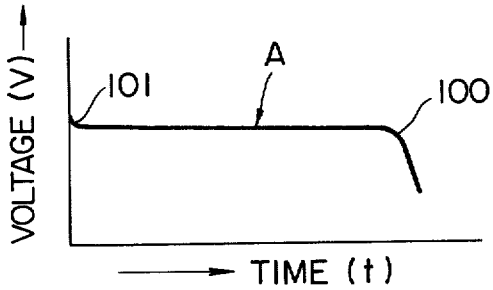
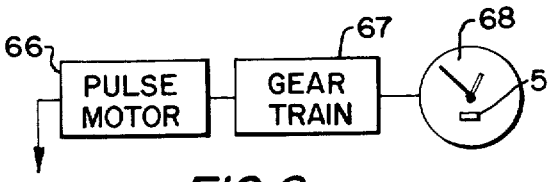
FIG. 2
FIG. 2a
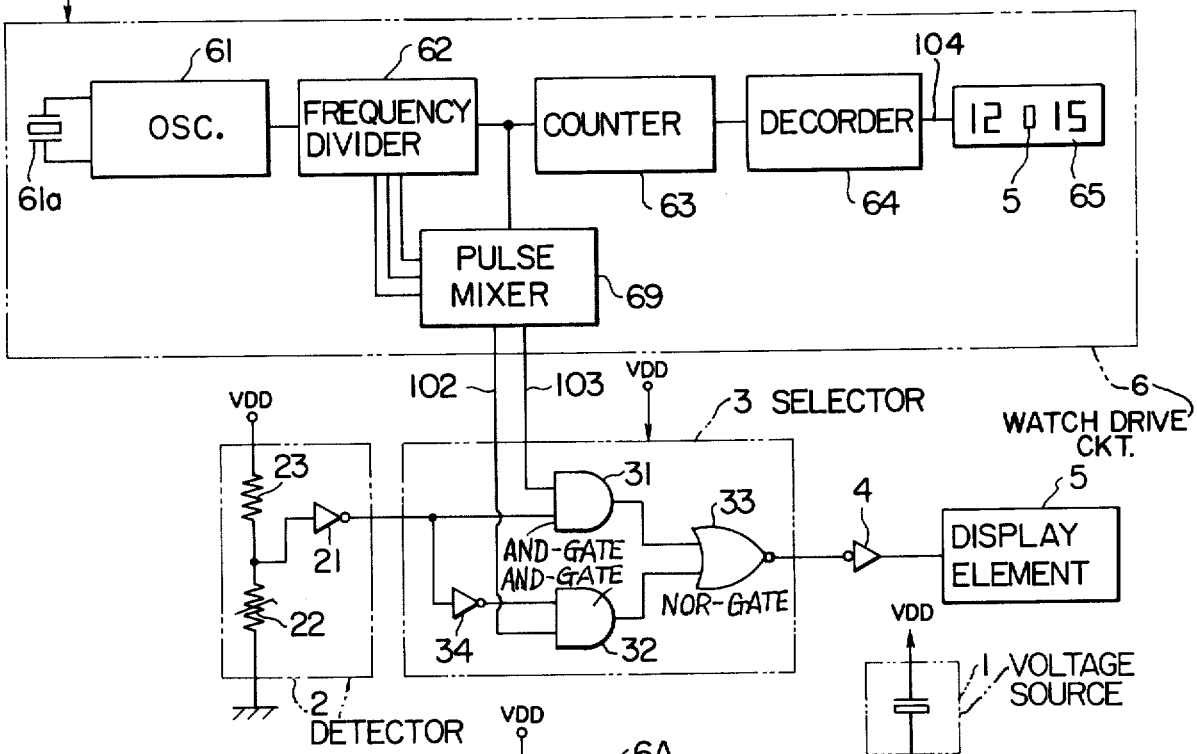
FIG. 3
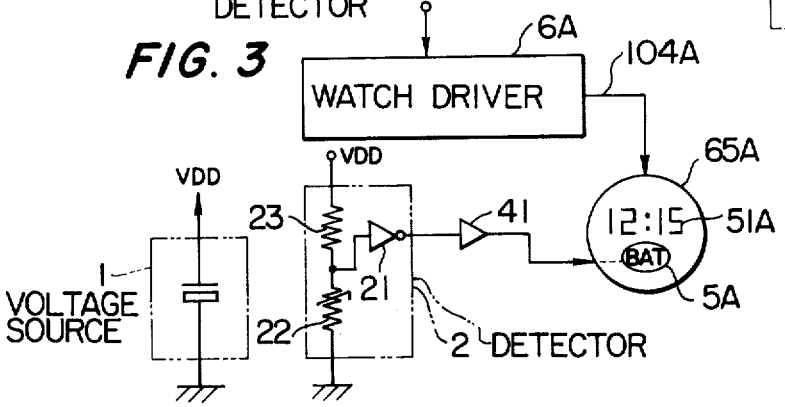

BATTERY-DRIVEN WATCH WITH BATTERY CONSUMPTION DISPLAY ALARM

Matter enclosed in heavy brackets [ ] appears in the original patent but forms no part of this reissue specification; matter printed in italics indicates the additions made by reissue.

BACKGROUND OF THE INVENTION

This invention relates to a battery-driven watch fitted with a built-in alarm mechanism for alarming beforehand the consumed condition of the battery.

A predominant drawback of the battery-driven watch is such that the battery could be consumed up without alarming beforehand the consuming-up condition of the battery to the watch-carrying person. Conventionally, the watch owner will become aware of the consumed battery only upon it has been consumed up and the watch fallen into its inoperative state.

If there is substantially no battery change facility in such a case that the watch owner should make a trip to far from the town, as an example, he can not utilize the time-indicating service of the watch.

SUMMARY OF THE INVENTION

It is, therefore, a main object of the present invention to provide a battery-driven watch fitted with a built-in alarm device capable of warning a possible consumed-up condition of the watch beforehand, and say, at least a week before the perfect stoppage of the operation of the timepiece.

This and further objects, features and advantages of the invention will become more apparent when read the following detailed description of the invention by reference to the accompanying drawings illustrative by way of several preferred embodiments of the invention.

BRIEF DESCRIPTION OF THE DRAWINGS

In the drawings:

FIG. 1 is a representative characteristic curve of a battery wherein the voltage is plotted against the battery operating time.

FIGS. 2–2a and 3–5 are connection diagrams of first to fourth embodiments of the invention, respectively.

DETAILED DESCRIPTION OF THE INVENTION

Figure 4:
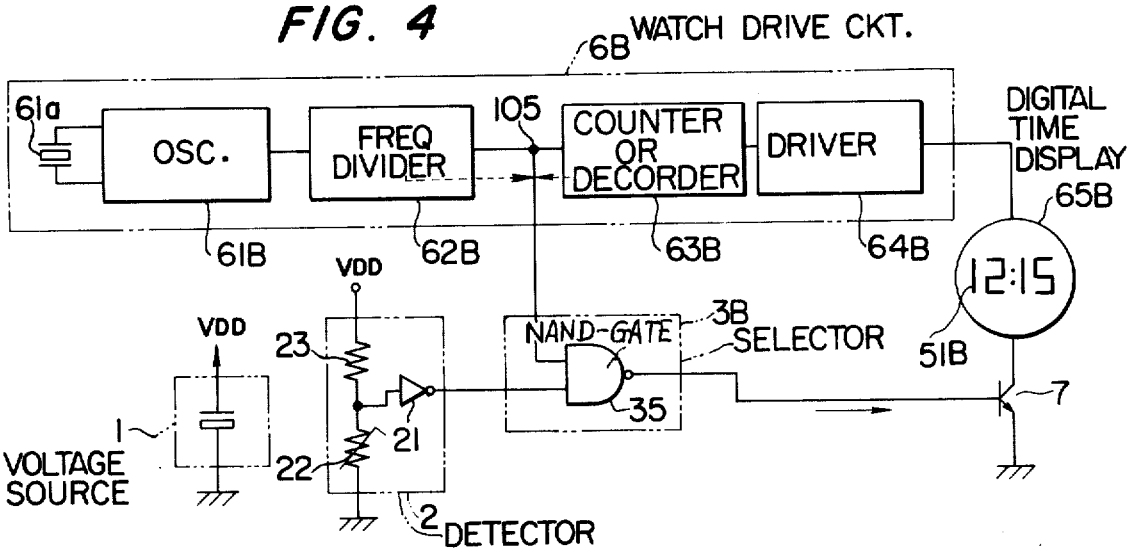

Referring now to the accompanying drawings, several preferred embodiments of the invention will be described in detail hereinbelow.

In FIG. 1, a typical characteristic curve of a mercury- or silver battery is shown wherein the voltage is plotted against time as appearing when the battery is connected to a load.

According to the present standard practice, the voltage drop point as at 100 in FIG. 1 is set as appearing upon lapse of time longer than one year.

The setting will be influenced naturally by the occasionally encountered variation in the consumed current, the capacity of the battery and the loaded conditions.

As shown at 101 in FIG. 1, the characteristic curve "A" represents an initial voltage drop and then a generally flat curve providing a substantially constant voltage level over a rather long operating period until a sharp and abrupt voltage drop as at 100 will appear, as was referred to hereinabove. At the arrival of this voltage drop point 100, the dry battery must be discarded as consumed up.

In FIG. 2, a voltage drop detector 2 and a selector 3 ae shown schematically as coupled to a regular electronic watch movement drive circuit 6. In this embodiment, 1 represents a drive battery adapted for energization of all the circuit components to be described. The detector circuit 2 comprises a fixed resistor 23, a variable resistor 22 and an inverter 21 electrically connected one after another as shown; said inverter 21 may preferably be a MOS-semiconductors.

The selector circuit 3 comprises AND-gates 31 and 32, a NOR-gate 33 and an inverter 34; these circuit elements are electrically connected with each other and with the circuits 2 and 6 as shown. The output of NOR-gate 33 is electrically connected through an amplifier 4 to a display element 5 which may be of the liquid crystal, illuminating diode or the like type.

The AND-gates 31 and 32 are controlled by output signals from the detector 2 for allowing selective passage of the pulses delivered from the drive circuit 6 and for periodical on-off operation of the display element 5, as will be more fully described hereinbelow.

The watch movement drive circuit 6 of the conventional type comprises an oscillator 61 and a frequency divider 62 which combination is designed and arranged, so as to deliver an electric voltage pulse per second, as an example. When the timepiece is of the digital type, the circuit 6 further comprises a counter 63, a decoder 64 and a digital display device 65 which are connected as shown. Or alternatively and as shown in FIG. 2a, when the watch is of the analog type, the circuit 6 comprises a pulse motor 66, a regular time-indicating gear train 67 and a time display mechanism 68, in place of and as direct substitutes for the aforementioned digital constituents 63–65, although these elements 63–68 have been shown only schematically by virtue of their very popularity among those skilled in the art.

The drive circuit 6 comprises further a pulse mixer 69, only schematically shown, adapted for delivery of seconds pulse series and half second pulse series having properly selected pulse width in the preferred embodiment so far shown and described. The former pulse series is delivered through first output lead 102 and the latter pulse series is delivered through second output lead 103 which extend from the respective outputs of the mixer 69 to the inlets of AND-gates 32 and 31, respectively.

The operation of the first embodiment is as follows:

By manipulating the variable resistor 22, the input voltage to inverter 21 is adjusted to such level as slightly higher than the threshold voltage of an input transistor, not shown, contained in the inverter, upon applying the regular source voltage from the drive battery 1 to input terminal VDD of the detector 2. The resultant resistance of the series-connected resistors 22 and 23 is selected to be a higher level as possible from the view point of power consumption efficiency, so far as allowable without giving rise to instability of the detector operation.

By the establishment of the aforementioned operational conditions, the output from first inverter 21 will become binary 0, so far as the drive battery 1 delivers its regular voltage, while the output from second inverter 34 will become binary 1, thus, the AND-gate 32 being kept in its conducting state. Therefore, the display element 5 will periodically ignite with seconds-series pulses fed from the drive circuit 6 through first lead 102.

On the other hand, if the source voltage should drop abruptly as at 100 in FIG. 1, the putput from first inverter 21 will become binary 1 and first AND-gate 31 is brought into its conducting state. Thus, the display element 5 will periodically ignite at a quicker frequency with the half-second pulse series conveyed from the drive circuit 6 through second lead 103. In this respect, it should be noted that the element 5 is shown in triplicate in FIG. 2.

It will be seen from the foregoing that the display element 5 performs a periodic flashing operation with seconds pulse series when the battery keeps its normal operating voltage and with half second pulse series when and after the battery voltage has dropped abruptly from the normal operating voltage.

By slight modification of the circuit arrangement although not shown on account of easy occurrence to any person skilled in the art, the half second pulse series to be delivered in the latter case may be modified to either slower or quicker mode than that above specified, as far as it can be discriminated from the regular seconds pulse series. As an example, the alarm signal pulses series may have a period of several seconds or of a second divided by an integer larger than 2, as the case may be.

On the other hand, the regular seconds pulse series may be modified so as to have a different period than a second and as occasion may desire.

From the data raised in this Table 1, it will be seen that if the detector has been designed to detect a 50 mV-voltage drop and the electronic watch drive circuit can operate with 1.4 volts at the lowest, an alarm period longer than a week may be provided until the watch movement ceases its operation.

A more specific example of several consumption characteristic data of an electronic watch drive battery is shown in the following Table 1:

Table 1

| | |
|---|---|
| battery capacity: | 150 mA h; |
| normal effective life: | longer than 360 days; |
| normal working voltage: | 1.56 volts; |
| remaining working period: | 15 days between voltages 1.56 and 1.50; |
| " | 7 days between voltages 1.50 and 1.40; |
| " | 3 days between voltages 1.40 and 1.30; |

Next, referring to FIG. 3, the second embodiment of the invention will be described in detail.

In this Figure, numeral 1A represents again the drive battery having the output terminal VDD acting as an input to the detector circuit 2 which comprises fixed resistor 23, variable resistor 22 and inverter 21 arranged in the similar manner as before.

Numeral 6A represents the electronic watch movement drive circuit designed and arranged as at 6 in the foregoing first embodiment, yet being devoid of pulse mixer 69. The output of the drive circuit 6A is electrically connected through lead means 104A to conventional digital display device 65A which is similar in its design and function as those of the device which was shown at 65 in the foregoing. The device 65 or 65A comprises a number of electro-optical display elements which are energizable by impressed voltages as commonly known supplied from the outputs of the drive circuit 6 or 6A and now shows a specific time point of 12 hours 15 minutes, as an example.

The output of inverter 21 is connected through an amplifier 41 to an illuminatable alarm 5A which is provided on the display device 5A.

The operation of the second embodiment is as follows:

When the battery 1 keeps its normal operating voltage, the output from inverter 21 will become binary 0 and thus, the illuminatable alarm 5A does not ignite.

On the other hand, when the battery voltage shows an abrupt drop as at 100 in FIG. 1, the output from inverter 21 will represent binary 1 and thus the alarm 5A will ignite for providing a visual alarm signal to the bearer of the watch.

In FIG. 4, the third embodiment of the invention is illustrated.

Figure 5:
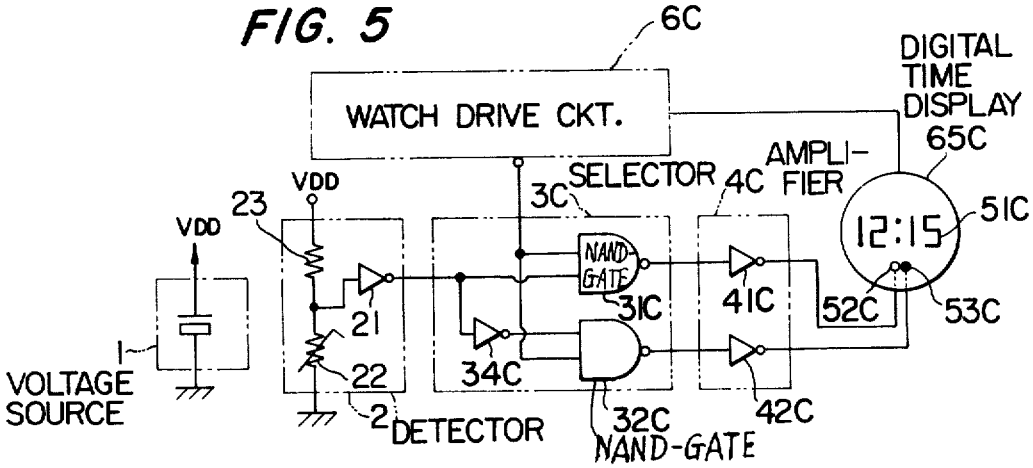

In this Figure, numerals 1, 2, 21, 22 and 23 represent respective similar constituents as before. This is applied to FIG. 5 showing the fourth embodiment. In the similar way, numerals 6B, 61B, 62B, 63B, 64B and 65B represent respective similar constituents denoted 6, 61, 62, 63, 64 and 65 as before.

The conventional digital display device comprises illuminatable time display elements 51B which are energized by output voltages from the watch movement drive circuit 6B.

Numeral 3B represents a selector circuit which comprises a NAND-gate 35 having two inputs. One of these inputs is connected with a junction point 105 positioned between two blocks 62B and 62C, while the other input is connected with the output of inverter 21.

7 represents a switching transistor which is so connected although not specifically shown as to earth the common negative terminal to the illuminatable time display elements 51B or to interrupt the earth connection, depending upon the implied input from NAND-gate 35.

With the said arrangement, the output from inverter 21 will become binary 0 and the output from NAND-gate 35 will become binary 1 when the working voltage of battery 1 is at the normal level so that the illuminatable display elements 51B perform their regular minutely and digitally stepping-up time display job by receiving signal output from the decoder 64B, as known per se.

On the contrary, when the working voltage at the battery 1 shows an abrupt drop as at 100 in FIG. 1, binary outputs 0 and 1 will alternatively appear at the output of NAND-gate 35, depending upon the inputs from the drive circuit 6B.

If occasion may desire, the time display mode can be reversed by slight modifying the design of the constituent circuit elements in such a way that with the regular working voltage kept at the battery 1, the display elements 51B will flicker, while, when the battery voltage should drop abruptly, they illuminate continuously when neglecting the minutes display changes, as may easily occur to those skilled in the art.

In the fourth embodiment shown in FIG. 5, selector circuit 3C comprises NAND-gates 31C and 32C and an inverter 34C connected with each other and with the watch movement drive circuit 6C, as shown, which may have similar structure and arrangement as those of the foregoing drive circuit 6B.

Amplifier circuit 4C comprises two separate amplifiers 41C and 42C, the outputs of which are connected to illuminatable or seconds flashing elements 52C and 53C, respectively, mounted on digital display device 65C as before. Outputs of NAND-gates 31C and 32C are connected to inputs of these amplifiers 41C and 42C, respectively. These flashing elements may preferably be green and red light dissipatable photo-diodes of their equivalent means.

With such arrangement of the present embodiment, green light flashing can be performed when the battery voltage is at its regular level, while red light flashing can be executed after the battery voltage has dropped beyond a predetermined critical level.

Figure 7:
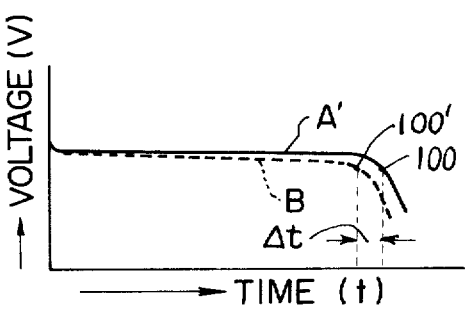
FIG. 7 is a chart plotted in the similar manner to FIG. 1, in a better form adapted for the illustration of operation of the fifth embodiment.
Figure 8:
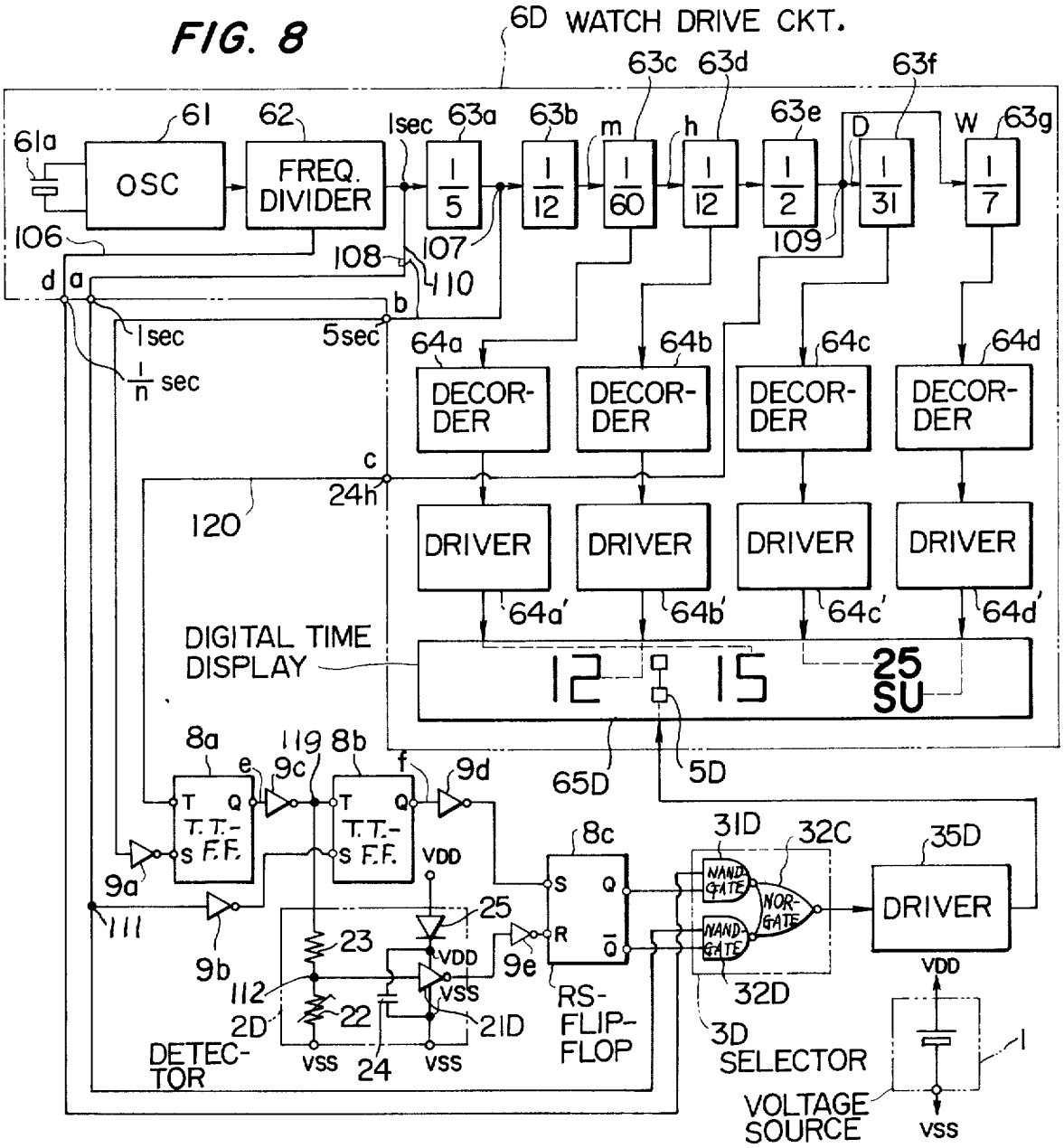
FIG. 8 is a similar view to FIG. 2, illustrating the fifth embodiment of the invention.

Before describing the fifth embodiment shown in FIG. 8, the principle thereof is briefly illustrated in FIG. 7 which is similar battery characteristics shown in FIG. 1. In FIG. 7, the full line curve A' is similar to that denoted A in FIG. 1, denoting that a lightly loaded condition of a small mercury, silver or the like battery as most frequently used one for electronic watches. The dotted line B is that appearing under heavy loaded condition.

As seen from FIG. 7, when the battery is loaded nearly at the end of its durable life, a more predominant voltage drop will be encountered by application of a heavier load than the case of a lighter load application. There would be thus such a possibility that a daily, weekly or monthly application of a heavier load in a sampling manner to a battery normally operating with a lighter load, reliance may be placed upon the aforementioned rather more predominantly appearing voltage drop for detecting a nearly consumed condition of the battery. The next following embodiment utilizes such load sampling principle for the desired purpose.

In FIG. 8, 6D represents schematically an electronic watch drive circuit comprising an oscillator circuit 61 having a known quartz oscillator. The use of this kind of the high precision timebase can equally be applied to any of the foregoing embodiments. The circuit 6D further constituents 62; 63a; 63b; 63c; 63d; 63e; 63f; 63g; 64a; 64b; 64c; 64d; 64a'; 64b'; 64c'; 64d' and 65D connected with each other as shown.

Numeral 62 represents the frequency divider as before, which is of a multistage type, processing the outputs from the oscillator circuit 61 into seconds pulse series, as commonly known per se. From an intermediate stage of the multistage frequency divider, a lead 106 extends so as to deliver therefrom a more frequent 1/n-second period pulse series when assuming that n is a positive integer.

The output from frequency divider 62 is supplied successively to conventional time computers 63a; 63b; 63c; 63d; 63e, thence simultaneously to time computers 63g, and 63f, all the said computers being preferably respective conventional ring counters. In this respect, numerical representations: "1/5"; "1/12"; "1/60"; "1/12"; "1/2"; "1/31" and "1/7" represent respective frequency-divided ratios. From junction point 107 positioned between both blocks 63a and 63b, an output lead 108 extends for delivery of 5-seconds period pulse series. It will be seen from the foregoing that from the block 63b, 1 minute period pulses series is delivered to next following block 63c from which 1 hour period pulse series is delivered. In the similar manner, 24-hour period pulse series is delivered from junction point 109 positioned between the blocks 63e and 63f and through an output lead 120.

The ratio "1/31" corresponds naturally to the odd month. For even month, the ratio is modified accordingly and manually by supply of a shift pulse by conventional means coupled with the time-setting stem of the watch, although not specifically shown on account of its very popularly.

Binary contents of the ring counters 63c; 63d; 63f and 63g are conveyed to conventional decorders 64a; 64b; 64c and 64d, respectively, the outputs therefrom are conveyed through respective drivers of the conventional structure to digital illuminatable display elements on the digital time display device 65D, as conventionally. As seen from FIG. 8, the device 65D displays, as an example, "SUNDAY", 25th day of a month, and 12 hours 15 minutes.

Figure 6:
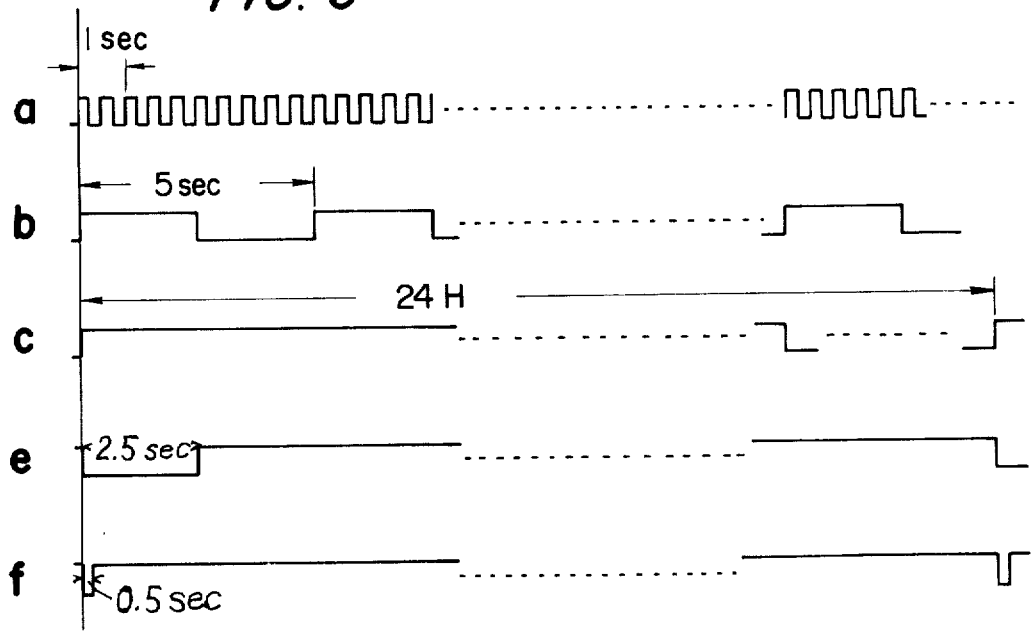
FIG. 6 is a chart showing several wave forms appearing at several parts of a fifth embodiment shown in FIG. 8.

The aforesaid 1-second period pulse series, shown at a in FIG. 6, will be conveyed from junction point 109 through output lead 110 extending therefrom via a terminal a and further junction 111 to inverter 9b and simultaneously to one input of NAND-gate 32D included in the selector 3D.

The aforesaid 5-second period pulse series, shown at b in FIG. 6, will be conveyed from junction point 107 through lead 108 including terminal b to inverter 9a, the output thereof being connected to a S-input terminal of a toggle type flip-flop 8a.

The aforementioned 24-hour period pulse series, shown at c in FIG. 6, will be transmitted from junction 109 through output lead 120, including terminal c, to another T-input terminal of the same flip-flop 8a.

The aforementioned 1/n-second period pulse series, including terminal d, n being 2 as an example, will be conveyed through lead 106 to an input of NAND-gate 31D included in the selector 3D. Q-output terminal of flip-flop 8a, the output signal being shown at e in FIG. 6, is connected through inverter 9c and a junction point 119 to T-input terminal of a further flip-flop 8b. The output of inverter 9b is connected to S-input terminal of the same flip-flop 8b. Q-output terminal of the latter, the output signal being illustrated at f in FIG. 6, is connected through a further inverter 9d to S-input terminal of RS-flip-flop 8c.

Detector 2D comprises, as before, fixed resistor 23 and variable resistor 22, the input side of the latter being connected with said junction 119. The input side of inverter 21D is connected to a point positioned between the resistors 22 and 23 as before. The output of the inverter 21D is connected through a further inverter 9e to R-input terminal of the flip-flop 8c. Q-output terminal of flip-flop 8c is connected to another input of NAND-gate 31D. In the similar way, $\overline{Q}$-output terminal of flip-flop 8c is connected to another input of NAND-gate 32D.

The positive pole of the voltage source 1, FIG. 8, is connected through a diode 25 to positive terminal of the inverter 21D as hinted at VDD, while the negative terminal thereof is earthed as hinted at VSS. Across this inverter 21D, a capacitor 24 is connected. The output of NAND-gates 31D and 32D are connected to inputs of NOR-gate 32C, the output of the latter is connected to a driver 35D, preferably an amplifier, the structure of which is similar to that denoted 35 in the foregoing. The output of the driver 35D is connected to illuminatable display element 5D which is similar to that denoted 5 in the foregoing.

The operation of the fifth or last embodiment shown in FIG. 8 is as follows.

As seen especially from at e in FIG. 6, the flip-flop 8a produces a sampling signal extending for 2.5 sec once per day. By application of this sampling signal, the inverter 9c will act as a conducting switch so that the VDD-terminal of the voltage source 1 is connected to the series-connected resistors 22; 23, through the latter, thus, current flows. Since, in this case, the practical resistance values of these elements 22, 23 have designed and adjusted to substantially lower levels than those which were set in the foregoing embodiments where no such sampling job is performed, the flow current is stronger than before. For this purpose, certain preparatory experiments are executed beforehand, so as to set the passing current positioned on the curve B in FIG. 7, as nearly as possible.

The resistance value at 22 in FIG. 8 has been so adjusted that the voltage appearing in this case at the intermediate junction 112 positioned between the resistors 22 and 22 is slightly higher than the threshold voltage of the inverter 21D. At the substantial operating period of the battery 1, FIG. 8, signals are implied at the both inlets S and R of RS-flip-flop 8c and the output $\overline{Q}$ becomes binary 1, since the signal pulse implied at the R-input has a longer period than that appearing the other input S, thereby seconds pulse series being supplied to the element 5D for flashing the latter as an discriminating visual symbol to show the electronic watch operates in its regular operating mode with the battery 1 kept at its regular voltage level along the effective voltage level as shown by the flat portion of the voltage curve A' shown in FIG. 7.

On the other hand, when the battery 1 is about to be consumed up, the voltage delivered through junction 112 becomes insufficient to reverse the state of the inverter 21D and thus, input signal will appear only at S-input terminal of the flip-flop 8c, thereby its output Q representing binary 1. Therefore, the quicker frequency 1/n-second period pulse series will be applied to the element 5D. In this way, the element 5D flashes at this rather quicker frequency for the display of the about-consumed condition of the battery 1 as shown at 100' on the dotted line curve B, in advance of the occurrence of the point 100 appearing on the full line curve A' in FIG. 7 by a certain advance period $\Delta t$ which may be 10 days as an example.

The provision of the condenser 24 is for the purpose of keeping the established operating voltage level at the inverter 21D than otherwise. In this way, the voltage VDD-VSS as applied to the inverter 21D can be maintained substantially at a predetermined constant level, if the battery voltage should drop for a short time period such as 5 seconds as an example.

The provision of the toggle type flip-flop 8b is for the purpose of making the duration terms of the input signal at S-terminal of RS-flip-flop 8c to be shorter than that of the input signal at R-terminal of the same flip-flop 8b.

With the design and arrangement of the present last embodiment so far shown and described, such efficient and advance alarm means may be provided for the battery-driven electronic watch with least possible current consumption for such alarm means which consumes an appreciable power only for each sampling period. Naturally, the above-specified sampling period of 5 seconds per day may be modified to any selected more economic value.

The embodiments of the invention in which an exclusive property or privilege is claimed are as follows:

1. In a battery driven electronic watch comprising a watch driver circuit, a battery for feeding current thereto, and a time-indicator operatively connected with said driver circuit, the improvement comprising a binary detector circuit connected to said battery for detecting when the source voltage falls below a predetermined level, a selector and drive circuit connected with the output of said detector, and an electrically illuminatable means connected with said selector and drive circuit, the brightness of said illuminatable means being modified from its normal state when said source voltage drops below said predetermined level in response to the binary logic output of said detector, said electrically illuminatable means being mounted on the front and normally visible surface of said watch.

2. In a battery-driven electronic watch comprising a source battery, an electronic watch driver circuit fed current therefrom and a digital time display means comprising a plurality of electrically illuminatable elements driven by said circuit, the improvement comprising a detector for sensing an abrupt voltage drop at the said battery, and a selector for selecting either a first signal series demonstrating the normal operating voltage kept at said battery or a second signal series of a different signal frequency from that of the first signal series and demonstrating a voltage-dropped condition of said battery, depending upon the state of said detector and derived from said driver circuit, at least one of said elements being supplied with either of said both signal series depending upon the state of said selector.

3. Electronic watch as set forth in claim 2 further comprising a sampler coupled with said detector and said selector, for impressing for periodically established short time periods a higher current to said detector than that of the normal operating current derived from said battery.

4. Electronic watch as set forth in claim 3, wherein said sampler comprises two series-connected toggle type flip-flops and an RS-flip-flop arranged downstream thereof.

5. The electronic watch as set forth in claim 1, wherein said electrically illuminatable means comprises an optical display element which is normally in its non-illuminated state but is caused to illuminate when said source voltage drops below said predetermined level.

6. The electronic watch as set forth in claim 5, further comprising a sampler coupled with said detector and said selector for impressing for periodically established short time periods a higher current to said detector than that of the normal operating current derived from said battery.

*7. In a battery driven electronic timepiece comprising a timepiece driver circuit, a battery for feeding current thereto, and a time-depending display means operatively connected with said driver circuit, the improvement comprising a binary detector circuit connected to said battery for detecting when the source voltage falls below a predetermined level, a drive circuit connected with the output of said detector, an electronic sampler arranged between said timepiece driver circuit and said detector, said display means being connected with said driver circuit and a display operation of said means being modified from its normal state when said source voltage drops below said predetermined level in response to the binary logic output of said*

*detector, said means being mounted on the front and normally visible surface of said timepiece.*

*8. In a battery driven electronic timepiece comprising a timepiece driver circuit, a battery for feeding current thereto, and a time-indicator operatively connected with said drive circuit, the improvement comprising a binary detector circuit connected to said battery for detecting when the source voltage falls below a predetermined level, a selector and drive circuit connected with the output of said detector, a sampler coupled with said timepiece driver circuit and said detector, a keeping means coupled with said sampling means, detector and selector for keeping the binary output of said detector, and an electro-optical alarm means connected with said selector and drive circuit, an operational mode of said alarm means being modified from its normal state when said source voltage drops below said level in response to the binary logic output of said detector, said alarm means being mounted on the front and normally visible surface of said watch.*

*9. The timepiece of claim 7, further comprising a divider adapted for dividing the source voltage into a part amounting to a value slightly above the threshold value of an inverter included in said detector, and a remaining part.*

*10. The timepiece of claim 8, further comprising a divider adapted for dividing the source voltage into a part amounting to a value slightly above the threshold value of an inverter included in said detector, and a remaining part.*

* * * * *